United States Patent
Oka et al.

(10) Patent No.: US 9,308,589 B2
(45) Date of Patent: Apr. 12, 2016

(54) DRILL

(71) Applicants: Sumitomo Electric Industries, Ltd., Osaka-shi (JP); Sumitomo Electric Hardmetal Corp., Itami-shi (JP); Kawasaki Jukogyo Kabushiki Kaisha, Kobe-shi (JP)

(72) Inventors: Hisao Oka, Osaka (JP); Yoshiji Sato, Itami (JP); Kiichi Meguro, Itami (JP); Junichi Tamura, Kakamigahara (JP); Satoshi Suzuki, Kakamigahara (JP)

(73) Assignees: Sumitomo Electric Industries, Ltd., Osaka-shi (JP); Sumitomo Electric Hardmetal Corp., Itami-shi (JP); Kawasaki Jukogyo Kabushiki Kaisha, Kobe-shi (JP)

( * ) Notice: Subject to any disclaimer, the term of this patent is extended or adjusted under 35 U.S.C. 154(b) by 107 days.

(21) Appl. No.: 14/369,175

(22) PCT Filed: Dec. 25, 2012

(86) PCT No.: PCT/JP2012/083417
§ 371 (c)(1),
(2) Date: Jun. 26, 2014

(87) PCT Pub. No.: WO2013/099841
PCT Pub. Date: Jul. 4, 2013

(65) Prior Publication Data
US 2014/0363249 A1 Dec. 11, 2014

(30) Foreign Application Priority Data

Dec. 27, 2011 (JP) .................. 2011-285509
May 28, 2012 (JP) .................. 2012-120832

(51) Int. Cl.
*B23B 51/02* (2006.01)
*B23B 51/00* (2006.01)

(52) U.S. Cl.
CPC .............. *B23B 51/02* (2013.01); *B23B 51/009* (2013.01); *B23B 2226/27* (2013.01);

(Continued)

(58) Field of Classification Search
CPC .. B23B 51/009; B23B 51/02; B23B 2229/08; B23B 2251/18; B23B 2251/04; B23B 2251/046; B23B 2251/08; B23B 2251/14; B23B 2251/242; B23B 2251/24; B23B 2251/285; B23B 2251/28; Y10T 408/905; Y10T 408/906; Y10T 408/9065
See application file for complete search history.

(56) References Cited

U.S. PATENT DOCUMENTS 1,747,117 A * 2/1930 Klein ................. B23B 51/009
                                                  408/223
6,964,546 B1    11/2005  Vakil
(Continued)

FOREIGN PATENT DOCUMENTS

DE    29919858 U1 *  4/2000  .............. B23B 51/00
JP    55058907 A  *  5/1980
(Continued)

OTHER PUBLICATIONS

International Search Report and Written Opinion in PCT International Application No. PCT/JP2012/083417, dated Feb. 5, 2013.
(Continued)

*Primary Examiner* — Daniel Howell
(74) *Attorney, Agent, or Firm* — Venable LLP; Michael A. Sartori

(57) ABSTRACT

A small diameter portion having an outside diameter smaller than a diameter of the drill is formed on a front end side of a body of the drill in which a cutting edge includes at least two portions, that is, a rotation center side cutting edge portion and an outer peripheral side cutting edge portion and point angles of the respective cutting edge portions reducing gradually from the rotation center side cutting edge portion to the outer peripheral side cutting edge portion. The cutting edge with the point angles varied is formed in the small diameter portion. A flat cutting edge having an inclination angle β of 30° or less with respect to a line perpendicular to an axis of the drill is provided in a step portion formed between the small diameter portion and a large diameter portion.

7 Claims, 6 Drawing Sheets

(52) U.S. Cl.
CPC ...... *B23B 2226/275* (2013.01); *B23B 2226/31* (2013.01); *B23B 2226/61* (2013.01); *B23B 2228/10* (2013.01); *B23B 2251/046* (2013.01); *B23B 2251/14* (2013.01); *B23B 2251/18* (2013.01); *B23B 2251/201* (2013.01); *B23B 2251/245* (2013.01); *B23B 2251/408* (2013.01); *B23B 2265/34* (2013.01); *Y10T 408/906* (2015.01)

(56) References Cited

U.S. PATENT DOCUMENTS

| | | | |
|---|---|---|---|
| 2006/0056929 A1* | 3/2006 | Haenle | B23B 51/009 408/199 |
| 2009/0016832 A1 | 1/2009 | Onose et al. | |

FOREIGN PATENT DOCUMENTS

| | | | |
|---|---|---|---|
| JP | 62-039915 U | | 3/1987 |
| JP | 2001-054810 A | | 2/2001 |
| JP | 2001-087919 A | | 4/2001 |
| JP | 2001341018 A | * | 12/2001 |
| JP | 2008-000836 A | | 1/2008 |
| JP | 2009-172708 A | | 8/2009 |
| JP | 2010214478 A | * | 9/2010 |
| JP | 2010-284783 A | | 12/2010 |

OTHER PUBLICATIONS

Extended European Search Report for European Patent Application No. 12862768.4, dated Jul. 6, 2015.

* cited by examiner

DRILL

TECHNICAL FIELD

The present invention relates to a drill especially suitable to work a laminated plate including FRP (fiber reinforced plastic; composite material of reinforcing fiber and resin matrix) and metal.

BACKGROUND ART

Recently, FRP, especially, CFRP (carbon fiber reinforced plastic) has got into the limelight as a structural member for the fuselage and wings of an airplane. This CFRP, in some cases, is provided as a composite plate member in which CFRP is combined with relatively tenacious metal such as aluminum or titanium.

The composite plate member is used in the form of a laminated plate in which metal is laminated on one surface of CFRP (which is hereinafter simply called a laminated plate). In this laminated plate, for example, when it constitutes the fuselage or wings of an airplane, it is necessary to drill a hole through which a fastening member such as a bolt or a rivet is inserted.

In this drilling, there is used a special drill proposed by the present applicant in the below-cited patent document 1 or an ordinary drill of a standard blade type.

The drill disclosed in the patent document 1 includes a cutting edge which is disposed in the front end of a body of the drill and extends from the rotation center of the drill to the outer periphery thereof. The cutting edge includes at least three portions, namely, a rotation center portion, an intermediate cutting edge portion connected to the outer end of the rotation center portion, and an outer-most peripheral cutting edge portion connected to the outer end of the intermediate cutting edge portion, while the point angles of the respective cutting edge portions reduce gradually from the rotation center side to the outer peripheral side cutting edge portion.

PRIOR ART DOCUMENT

Patent Document

Patent Document 1: Japanese Patent Publication 2009-172708

SUMMARY OF THE INVENTION

Problems that the Invention is to Solve

In the case that a work material is the above laminated plate, by working it from above with the metal layer disposed downward, the metal layer is enabled to receive the thrust load that is hard to treat in working an FRP as a single member. This allows even a drill of a standard blade type to drill a hole satisfying required quality. However, the standard blade type drill has a short life and thus cannot enhance the productivity.

On the other hand, in the drill of the patent document 1, since the thrust applied to the cutting edge is reduced on the outside diameter side thereof, a hole of high quality with less burrs, scuffing, tear and chipping can be drilled in an FRP member.

However, although a desired effect can be expected in working the FRP as a single member, in drilling a hole in the above-mentioned laminated plate, the quality of the hole worked in the metal is degraded. As described above, when a hole is drilled from above in the laminated plate serving as the work material with the metal layer disposed downward, such cylindrical burrs A as shown in FIG. 10 occur in the exit of a hole formed in the metal layer, whereby a hole of high quality cannot be produced.

This problem occurs especially outstandingly in a composite CFRP member and it also occurs in a case where FRP contained in a work material is GFRP (glass fiber reinforced plastic).

The invention has an object to provide a drill which is effective in solving the above problem.

Means for Solving the Problems

In order to solve the problem, according to the present invention, in a drill for drilling a hole in a laminated plate including FRP and metal, comprising: a cutting edge disposed on a front end of a body as to extend from a rotation center of the drill to an outer periphery of the drill, the cutting edge being shaped symmetric with respect to the rotation center of the drill, the cutting edge including at least two portions, that is, a rotation center side cutting edge portion and an outer peripheral side cutting edge portion connected to a diameter-direction outer end of the rotation center side cutting edge portion, point angles of the respective cutting edge portions reducing gradually from the rotation center side cutting edge portion to the outer peripheral side cutting edge portion, a small diameter portion is provided on a front end side of the body, the small diameter portion having an outside diameter smaller than a diameter of the drill, the cutting edge with the point angles varied is formed in the small diameter portion, and a flat cutting edge having an inclination angle of 30° or less with respect to a line perpendicular to an axis of the drill is provided in a step portion formed between the small diameter portion and a large diameter portion, the large diameter portion being provided on a rear side of the small diameter portion and having an original outside diameter (diameter of drill).

It is preferable that in the drill for working the laminated plate including FRP and metal, a dimension of a diameter-direction step in a portion where the flat cutting edge is formed, which is obtained according to an expression $\{(D-d)/D\}$ where the diameter of the drill is expressed as $D$ and a diameter of the small diameter portion is expressed as $d$, is set at a ratio of 0.06 to 0.13 (step dimension per radius is ½ of this ratio) to the diameter of the drill.

Further, inclination angles $\beta$ of the flat cutting edge of 45° and 60° were tested, and as a result of the test, the inclination angle of 30° or less, especially, 15° or less was preferable because it had the great quality of worked hole. Here, it is considered that the inclination angle $\beta$ of the flat cutting edge is set to be a negative angle; however, with the negative inclination angle, a diameter-direction outer end of the flat cutting edge is too sharp, thereby becoming easy to be damaged. Thus, the inclination angle is preferably set to be positive inclination angle of 0° or more.

Moreover, it is effective that a helix angle at a main part (main helix angle) of the helical flute formed in the drill is set at an angle of 5° to 45°, more preferably, 15° to 45°, and a helix angle on the front end side of the drill is set to be smaller than the main helix angle by varying it.

It is good to vary the helix angle of the helical flute in the small diameter portion. The working of the drill is easy to be performed if the helix angle $\alpha 1$ in the small diameter portion and the main helix angle $\alpha 2$ on the rear side of the small diameter portion are set to be constant. However, the helix angle $\alpha 1$ in the small diameter portion can be set to increase stepwise or gradually from the front end side of the drill toward the rear side. In this structure, it is preferable that the helix angle $\alpha 1$ is set smaller by 5° to 10° than the main helix angle $\alpha 2$.

Further, it is preferable that a return portion is formed in a portion of the helical flute which forms the flat cutting edge, and a return angle of the helical flute in the return portion is set smaller by 5° to 10° than the main helix angle of the helical flute or a drill-axial-direction width of the return portion is set for 0.04 D to 0.07 D.

In view of the improvement of durability, it is preferable that a diamond film is formed on a surface of the body.

EFFECTS OF THE INVENTION

According to the drill of the invention, a flat cutting edge having an inclination angle $\beta$ of 30° or less is formed in the step portion between the front end small diameter portion and the portion having the original outside diameter, and this flat cutting edge is used to work the outside diameter side of a hole formed in metal such as aluminum.

When tenacious metal such as aluminum is worked by a cutting edge having a small point angle and capable of reducing thrust load, cylindrical burrs are rather easier to occur in the exit of a hole formed. In the case of the flat cutting edge provided in the invention, since larger thrust is applied to it than an ordinary drill, the outside diameter side of the worked hole can be cut clean up to the exit of the hole, thereby being able to produce a high quality hole with no cylindrical burrs.

Also, in the cutting edge provided in the small diameter portion on the front end side, since the point angle thereof reduces gradually from the rotation center side to the outer peripheral side cutting edge portion, the outside diameter side of a hole worked in FRP by the cutting edge of the small diameter portion is worked under the condition of small thrust load. After then, the flat cutting edge of the step portion works the hole to spread it.

Since the flat cutting edge is a cutting edge in which the thrust load increases, in working CFRP or GFRP, it causes interlayer separation (delamination). However, by properly setting the width (dimension of step) of the portion where the flat cutting edge is formed (by setting the width at a preferred ratio of 0.06 to 0.13 to the diameter of the drill), the degraded quality of the hole worked in FRP can be prevented, whereby the hole worked in FRP can also secure high quality.

MODE FOR CARRYING OUT THE INVENTION

Figure 1:
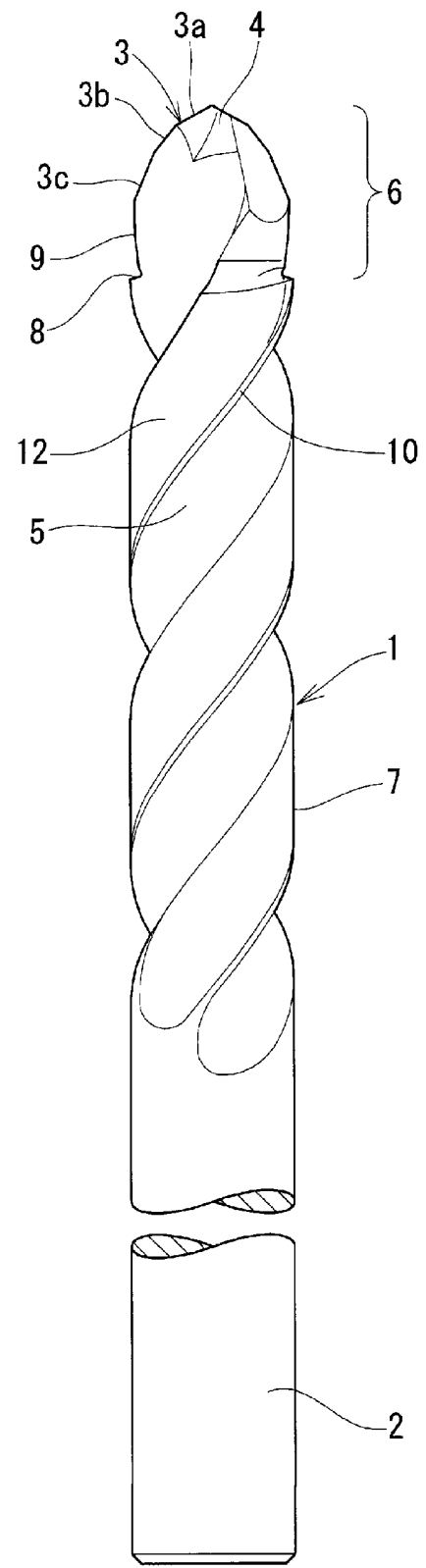
FIG. 1 It is a side view of the whole structure of a first embodiment of a drill according to the invention.
Figure 2:
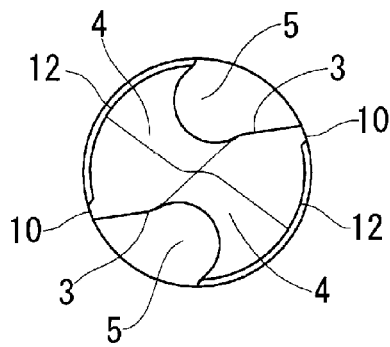
FIG. 2 It is an end face view of a front end side of the drill shown in FIG. 1.

Description is given below of an embodiment of a laminated plate working drill of the invention with reference to the accompanying FIGS. 1 to 9. These drawings show an application example in which the invention is applied to a solid drill. The drill is made of cemented carbide or the like and includes two cutting edges 3, 3 shaped symmetric with respect to the center of the drill in a front end of a body 1 extended from a front end of a shank 2, and thinning portions 4, 4 shaped symmetric with respect to the center of the drill and reducing in web thickness; and, further, two helical flutes 5, 5 in an outer periphery of the body 1.

A small diameter portion 6 is provided on the front end side of the body 1 and the cutting edges 3 are formed in the small diameter potion 6. Each cutting edge 3 of the drill, as shown specifically in FIG. 4, includes three portions, specifically, a rotation center side cutting edge portion 3a, an intermediate cutting edge portion 3b connected to a diameter-direction outer end of the rotation center side cutting edge portion, and an outer peripheral side cutting edge portion 3c connected to a diameter-direction outer end of the intermediate cutting edge portion 3b.

A point angle of each cutting edge portion reduces gradually from the rotation center side cutting edge portion to the outer peripheral side cutting edge portion, thereby providing a so called 3-angle type drill.

A portion of the body 1 situated on a rear side of the small diameter portion 6 is here called a large diameter portion. The large diameter portion 7 has an original diameter, thereby forming a diameter-direction step between the large and small diameter portions 7 and 6.

The invention provides a flat cutting edge 8 in such step portion, which is the characteristic of the invention. A diameter of the large diameter portion 7 of the body is expressed as D, a diameter of the small diameter portion 6 is expressed as d, and a diameter difference between the large and small diameter portions, that is, the dimension (2S) of the diameter-direction step, which is a portion where the flat cutting edge is formed, obtained according to an expression $\{(D-d)/D\}$ is set in a ratio of 0.06 to 0.13 to the diameter of the drill.

Figure 9:
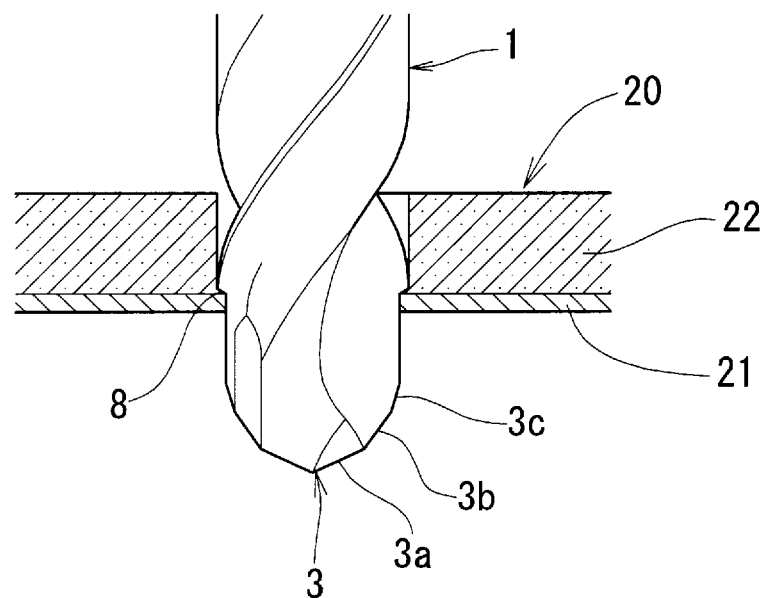
FIG. 9 It is a section view of a laminated plate with a metal layer disposed downward, showing a state where a hole is drilled by the drill of the invention.
Figure 10:
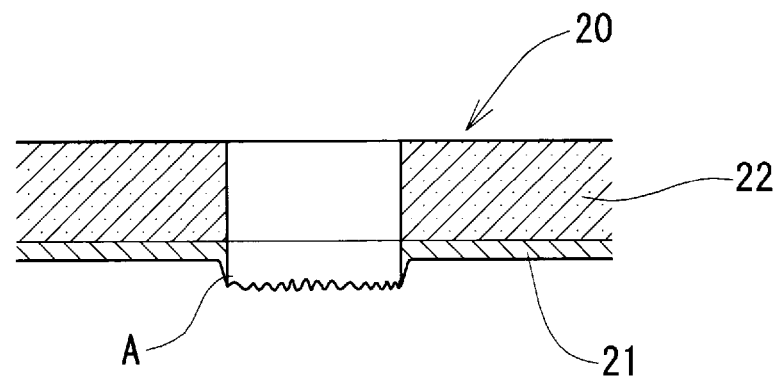
FIG. 10 It shows burrs formed in an exit of a worked hole in working a hole in a laminated plate with a metal layer disposed downward.

The reason of the selection of the above ratio range is as follows. That is, when a flat cutting area provided by the flat cutting edge 8 is excessively small, as shown in FIG. 9, in working a hole in a laminate plate 20 with a metal layer 21 disposed downward, the metal layer 21 is not cut but is crushed, thereby causing a worked hole to have cylindrical burrs in its exit portion. When the ratio of the dimension of the diameter-direction step to the diameter of the drill is set to be 0.06 or more, the cutting of the metal layer 21 by the flat cutting edge 8 is executed stably to reduce the crushing phenomenon, whereby a fine hole is formed.

Also, when the ratio of the dimension of the diameter-direction step to the diameter of the drill is set to be 0.13 or less, for a prepared hole previously worked in an FRP 22 by the cutting edge 3, a hole spreading area by the flat cutting edge 8 remains within a proper range, thereby avoiding a possibility that a prepared hole worked properly in the FRP 22 can be roughened when the flat cutting edge 8 spreads the hole.

An inclination angle β of the flat cutting edge 8 (an inclination angle with respect to a line perpendicular to an axis of the drill) is set to be in the range of 0° to 30°. With the inclination angle β of 30° or less, the cylindrical burrs occurred in the exit of a worked hole in working the laminated plate with the metal layer disposed downward can be reduced. Especially preferably, the inclination angle β may be 15° or less. Here, the inclination angle β may also be set to be a negative angle. However, with the negative angle, a diameter-direction outer end of the flat cutting edge 8 is too sharp, thereby raising a problem in the strength thereof. Thus, the lower limit of the inclination angle is set to be 0° or more.

Further, a connecting portion 9 with a slight back taper of the order of 0.8/100 to 2.0/100 is provided between a diameter-direction outer end of the cutting edge 3 and a start end of the flat cutting edge 8. Although the connecting portion 9 is not always an essential element, with the connection portion 9, after the work by the cutting edge 3 is ended completely, the flat cutting edge 8 bites into a work material, whereby burrs occurred in the metal layer of the laminated plate when it is cut by the cutting edge 3 can be removed more stably.

Figure 4:
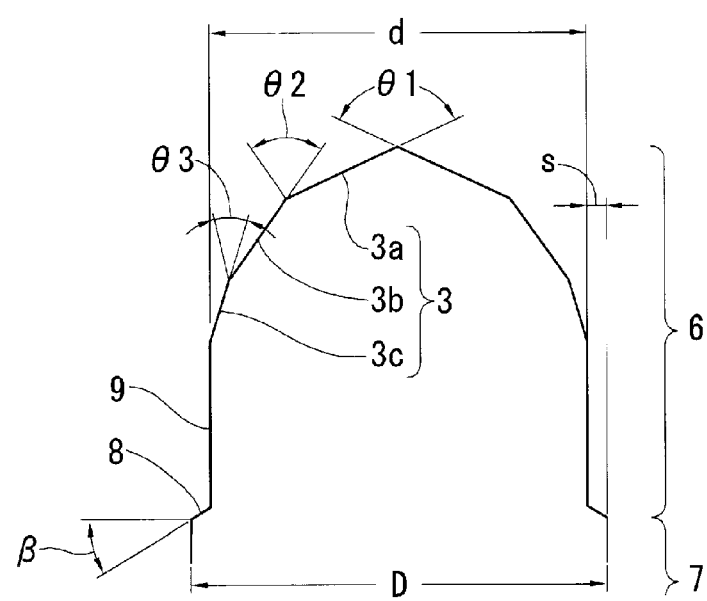
FIG. 4 It is a projection view of a cutting edge shape of the drill of FIG. 1.

In the drill, a point angle θ1 of the rotation center side cutting edge portion 3a is set for 130°, a point angle θ2 of the intermediate cutting edge portion 3b is set for 70° and a point angle θ3 of the outer peripheral side cutting edge portion 3c is set for 35°, as shown in FIG. 4. However, the point angles are not limited to the illustrated numerical values.

For example, for the point angle θ1 of the rotation center side cutting edge portion 3a, a proper value may be selected from the range of about 120° to 135°; for the point angle θ2 of the intermediate cutting edge portion 3b, a proper value may be selected from the range of about 70° to 100°; and, for the point angle θ3 of the outer peripheral side cutting edge portion 3c, a proper value may be selected from the range of about 55° to 10°.

A drill to which the invention is applied may also be a two-angle type drill with two kinds of point angles combined or a drill with three or more different point angles combined.

Figure 3:
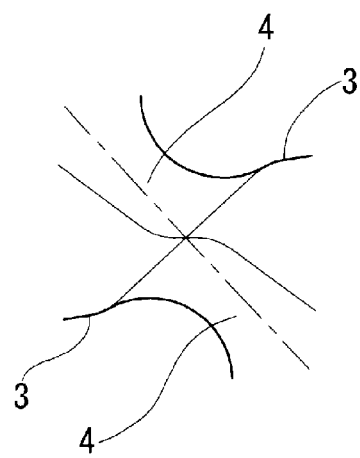
FIG. 3 It is an enlarged view of a rotation center portion of FIG. 2.

Also, as shown in FIG. 3, as the thinning portion 4, an overlap thinning portion (structured such that a thinning groove gets into a flank side beyond the center of the drill) may be preferably used because it can reduce thrust highly effectively. However, this is not limitative.

The helical flute 5 has a helix angle of about 5° to 45°. Although this helix angle is also not limitative specially, in working FRP, the tip end of the cutting edge is desired to be sharp and thus the helix angle may preferably be large, specifically, an angle of 15° to 45° is suitable.

Figure 6:
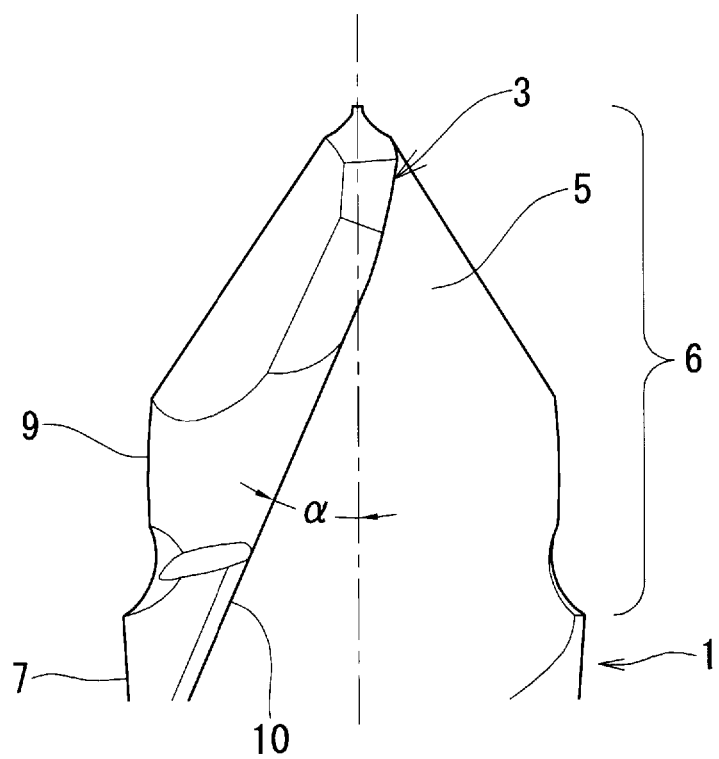
FIG. 6 It is a side view of the front end side of a drill in which a helix angle of a helical flute is constant.
Figure 7:
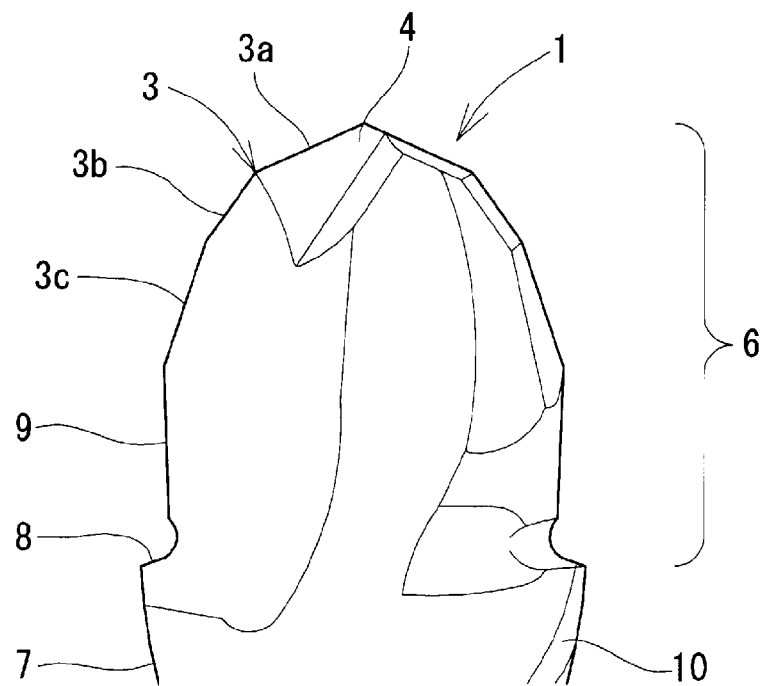
FIG. 7 It is a side view of a front end side of a drill in which a helix angle of a helical flute is varied in a rear end of a small-diameter portion.
Figure 8:
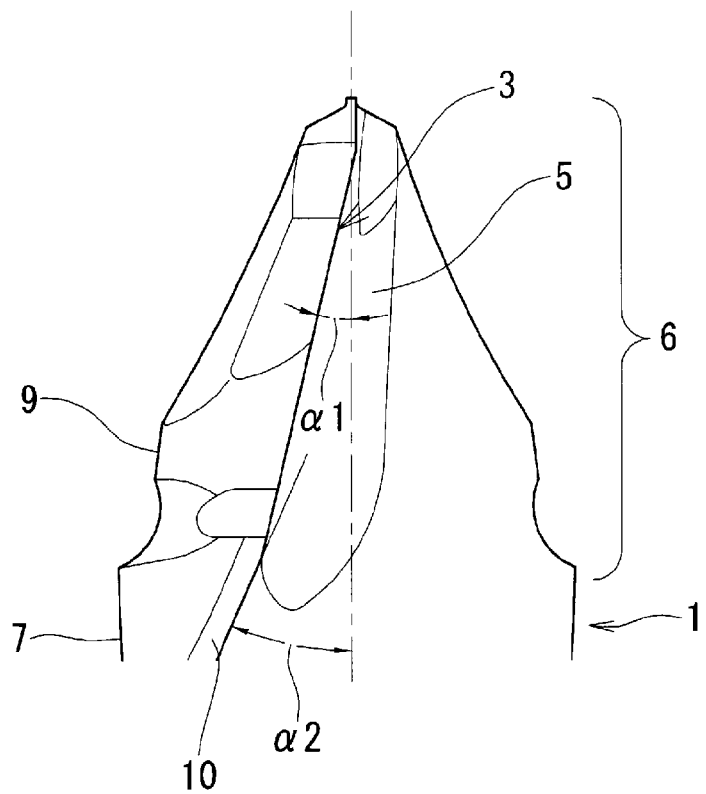
FIG. 8 It is a side view of the front end side of the drill shown in FIG. 7, when viewed from a direction rotated 90° from a position shown in FIG. 7.

Also, the helix angle α of the helical flute 5 may be constant as shown in FIG. 6. However, preferably, as shown in FIG. 8, the helix angle α1 of the small diameter portion on the front end side may be smaller than the helix angle (main helix angle α2) in a portion other than the small diameter portion 6. This structure can provide the following effects. To vary the helix angle in a longitudinal-direction intermediate portion of the helical flute 5 can be attained by cutting a portion of the flute surface of the helical flute 5.

Thus, a chip pocket in the front end portion of the drill is enlarged, thereby being able to enhance the chip discharge performance. Also, as the helix angle reduces on the front end side, a wedge angle increases, thereby being able to enhance the strength of the tip end of the cutting edge. Further, since a rake angle of the cutting edge 3 reduces, the force to rake the work material decreases, thereby being able to reduce the occurrence of delamination of the FRP.

When reducing the helix angle in the small diameter portion 6, the helix angle α1 of the small diameter portion 6 may preferably be about 5° to 10° smaller than the main helix angle α2. In the case that the difference is 5° or more, the effect of the varied helix angle can be provided sufficiently. The difference of 10° or less can prevent a thickness (back metal amount) of a portion, in which the cutting edge is formed, from reducing excessively and thus prevent the strength thereof from decreasing.

Here, the helix angle α1 in the small diameter portion 6 on the front end side need not always be constant. It may also be set to increase stepwise or gradually from the front end side of the drill toward the rear side.

In an outer periphery of the large diameter portion 7 of the body, margins 10 are provided at leading edges in a drill rotation direction of two land portions 12, respectively.

Figure 5:
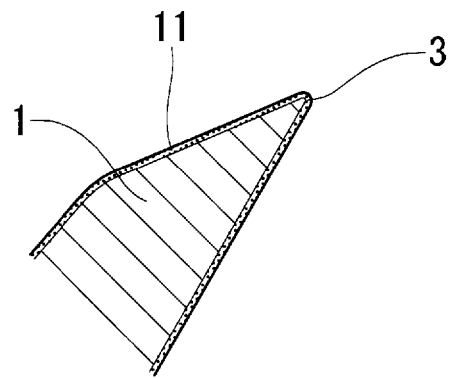
FIG. 5 It is an image view of a diamond film on a surface of a body.

As a further preferred structure, a diamond film 11 is formed on a surface of the body 1 (see FIG. 5). A drill having this diamond film 11 is excellent in life but is easy to produce a round shape in the cutting edge due to the influence of the film. In addition, the diamond film 11 increases a coefficient of friction with the work material. In this drill, therefore, when compared with a drill with no film, burrs occur in the exit of a hole formed in the metal layer of the laminated plate and metal is welded more to the drill.

In the drill of the invention, since it includes the flat cutting edge suitable for metal working, even when a diamond film is provided, burrs and welding of metal are hard to occur.

Here, although the foregoing description has been given with reference to a solid drill, the invention can also be applied to a cutting edge replaceable drill. The cutting edge replaceable drill is produced by mounting a removable cutting head on the front end side of the body and providing a cutting edge 3 and a flat cutting edge 8 on the cutting head.

The cutting edge replaceable drill is smaller in the number of times for regrinding in order to reproduce the cutting edge than the solid drill. However, it provides an advantage that, by replacing only the cutting head, the damaged cutting edge can be reproduced simply in a short time.

The problem to be solved by the invention, that is, the problem of occurrence of burrs in the hole exit of the metal layer of the laminated plate is especially outstanding in the CFRP laminated plate. However, since this problem arises also when FRP contained in the work material is GFRP (glass fiber reinforced plastics), the invention can provide an effect also in working a GFRP laminated plate.

Embodiment 1

A drill was experimentally produced, which has a diameter of the drill: D=6.375 mm, a dimension of the step portion: S=0.2 mm, point angles of cutting edges: θ1=130°, θ2=70° and θ3=35°, a diameter of an area where the point angle θ1 is applied=φ3.5 mm, a diameter of an area where the point angle θ2 is applied=φ5.3 mm, a diameter of an area where the point angle θ3 is applied=φ6.35 mm, a axial-direction dimension from the front end to flat cutting edge L=6 mm, an inclination angle of the flat cutting edge: β=15° and a helix angle of the helical flute=30° (invention product 1).

The following drills were also produced experimentally.

Invention product 2: a flat cutting edge inclination angle β=30°; other specifications are the same as the invention product 1.

Invention product 3: a step portion dimension S=0.4 mm; other specifications are the same as the invention product 1.

Invention product 4: a step portion dimension S=0.4 mm, a flat cutting edge inclination angle β=30°; other specifications are the same as the invention product 1.

Comparison product 1: no flat cutting edge is equipped; other specifications are the same as the invention product 1.

Comparison product 2: a flat cutting edge inclination angle β=45°; other specifications are the same as the invention product 1.

Next, using the above samples, a laminated plate obtained by laminating and bonding a CFRP plate and an aluminum plate (plate thickness: CFRP19 mm+aluminum 4 mm=23 mm) was worked with the aluminum plate disposed downward, under the following conditions.

Cutting conditions: working speed S=3200 min$^{-1}$, feed f=0.1 mm/rev.

As a result of this test, in the comparison product 1, large cylindrical burrs occurred in the exit of a worked hole formed in the aluminum plate. In the comparison product 2 as well, cylindrical burrs occurred in the exit of a worked hole formed in the aluminum plate, although not so large as in the comparison product 1.

On the other hand, holes worked in the invention products 3 and 4 were clean with no burrs in the exits thereof. In the invention products 1 and 2, a small quantity of cylindrical burrs occurred in the exit of worked holes formed in their aluminum plates. This seems because the step portion dimension S is rather short.

Embodiment 2

Using the same samples and the same work materials as the embodiment 1 and under the same working conditions, holes are worked in the work materials with the CFRP plate disposed downward. As a result of this test, in the comparison product 1, outstanding tear and fuzzing occurred in the exit of a worked hole formed in the CFRP plate. In the comparison product 2, although less than the comparison product 1, fuzzing occurred in the exit of a worked hole formed in the CFRP plate.

On the other hand, in holes worked by the invention products 1 to 4, less fuzzing occurred in the exits thereof. Specifically, in the invention products 3 and 4, slight fuzzing occurred. However, this seems because the flat cutting edges are more suitable for metal working than CFRP working.

Embodiment 3

Using a comparison product 3 having a flat cutting edge inclination angle β=15°, a step portion dimension S=0.5 mm, with the other specifications being the same as the invention product 1 and a comparison product 4 having a flat cutting edge inclination angle β=30°, a step portion dimension S=0.5 mm, with the other specifications being the same as the invention product 1, holes were worked in the same work material under the same working conditions as the embodiment 1. As a result of this test, in working the work material using the comparison products 3 and 4, interlayer separation of the CFRP plate occurred in the aluminum plate lamination interface portion thereof. This seems because the step portion dimension S was excessively large.

Embodiment 4

A drill was experimentally produced, in which only the small diameter portion has a helical flute helix angle of 25° and other specifications are the same as the invention product 1. Using this drill, holes are formed in the same work material under the same working conditions as the example 1. As a result, no back counter (return) was produced in the CFRP exit thereof. This seems because a chip pocket adjacent to the cutting edge is increased in size to thereby enhance the chip discharge performance.

Embodiment 5

Figure 11:
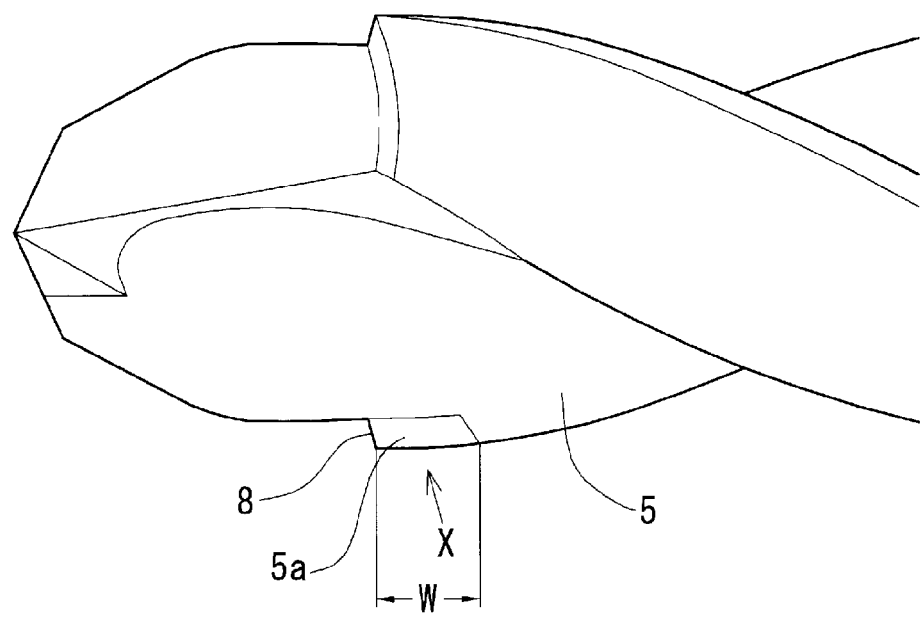
FIG. 11 It is an explanatory view of an axial-direction return width of a portion, in which return work is performed, of a helical flute in a flat cutting edge forming portion of the drill of the invention.
Figure 12:
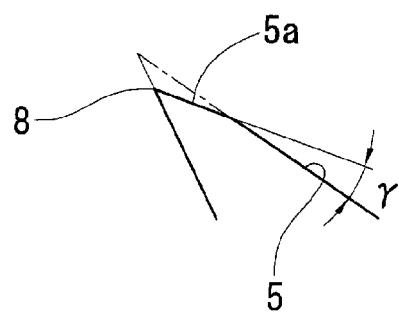
FIG. 12 It is an explanatory view (a view taken along an arrow X direction in FIG. 11) of a return angle of the portion, in which the return work is performed, of the helical flute in the flat cutting edge forming portion of the drill of the invention.

Return work of helix was performed on the helical flute (which serves as the rake face of the flat cutting edge) of the portion where the flat cutting edge is formed. Using the same specifications as the embodiment 1 except that an axial-direction return width W (see FIG. 11. The width in the axial direction of the return portion 5a) of the return portion is set for 0.04 D, and a helix angle (main helix angle) and a return angle γ (see FIG. 12) of the helical flute are changed, a hole was drilled in the same work material under the same working conditions as the embodiment 1. As a result, in the drill in which the return angle γ of the helical flute of the portion where the flat cutting edge is formed is set for 5° to 10° and the helix angle of the helical flute of the portion where the flat cutting edge is formed is set smaller by 5° to 10° than the main helix angle, the occurrence of burrs and delamination can be reduced, thereby being able to enhance the cutting edge tip end strength and worked surface quality.

The results of the performance evaluation of drills respectively having the main helix angles of the helical flutes of 45° and 40° in which the above angle return work was performed on the helical flute of the portion where the flat cutting edge is formed are shown in Tables 1 and 2.

TABLE 1

Drill with helical flute having main helix angle of 45°

| | Helix angle γ after return | | | |
|---|---|---|---|---|
| | 25° | 30° | 35° | 40° |
| Cutting edge strength | ○ | ○ | ○ | ○ |
| Worked surface quality (burrs, delamination) | Δ | ○ | ○ | ○ |

○: Good
Δ: Rather good

TABLE 2

Drill with helical flute having main helix angle of 40°

| | Helix angle γ after return | | | |
|---|---|---|---|---|
| | 20° | 25° | 30° | 35° |
| Cutting edge strength | ○ | ○ | ○ | ○ |
| Worked surface quality (burrs, delamination) | Δ | Δ | ○ | ○ |

○: Good
Δ: Rather good

Embodiment 6

Similarly to the embodiment 5, the return work was performed on the helical flute (which serves as the rake face of the flat cutting edge) of the portion where the flat cutting edge is formed. Using the same specifications as the embodiment 1 except that the return angle γ (see FIG. 12) of the return portion is set for 35°, and the helix angle of the helical flute and the axial-direction return width W (see FIG. 11) of the return portion are changed, a hole was drilled in the same work material under the same working conditions as the embodiment 1. The result shows that, in the drill in which the axial-direction return width W (see FIG. 11) of the return portion is set in the range of 0.04 D to 0.07 D, the occurrence of burrs and delamination can be reduced, thereby being able to enhance the cutting edge tip end strength and worked surface quality.

The results of this test on the performance evaluation of the drills with their helical flute main helix angles of 45° and 40° are shown in Table 3 and Table 4.

TABLE 3

Drill with helical flute having main helix angle of 45°

| | Return portion axial direction return width W | | | |
|---|---|---|---|---|
| | 0.02D | 0.04D | 0.07D | 0.10D |
| Cutting edge strength | Δ | ○ | ○ | ○ |
| Worked surface quality (burrs, delamination) | ○ | ○ | ○ | Δ |

○: Good
Δ: Rather good

TABLE 4

Drill with helical flute having main helix angle of 40°

| | Return portion axial direction return width W | | | |
|---|---|---|---|---|
| | 0.02D | 0.04D | 0.07D | 0.10D |
| Cutting edge strength | Δ | ○ | ○ | ○ |
| Worked surface quality (burrs, delamination) | ○ | ○ | ○ | Δ |

○: Good
Δ: Rather good

DESCRIPTION OF REFERENCE NUMERALS AND SIGNS

1: body
2: shank
3: cutting edge
3a: rotation center side cutting edge portion
3b: intermediate cutting edge portion
3c: outer peripheral side cutting edge portion
4: thinning portion
5: helical flute
6: small diameter portion
7: large diameter portion
8: flat cutting edge
9: connecting portion
10: margin
11: diamond film
12: land portion
D: diameter of drill
d: outside diameter of small diameter portion
θ: point angle
β: inclination angle of flat cutting edge
α1: helix angle of small diameter portion
α2: main helix angle
W: return width in an axial direction of helical flute in flat cutting edge forming portion
γ: return angle of helical flute in flat cutting edge forming portion

The invention claimed is:

1. A drill for drilling a hole, comprising:
a cutting edge (3) disposed on a front end of a body (1) as to extend from a rotation center of the drill to an outer periphery of the drill, the cutting edge being shaped symmetric with respect to the rotation center of the drill, the cutting edge including at least a rotation center side cutting edge portion (3a) and an outer peripheral side cutting edge portion (3c) connected to a diameter-direction outer end of the rotation center side cutting edge portion, point angles (θ) of the respective cutting edge portions reducing gradually from the rotation center side cutting edge portion (3a) to the outer peripheral side cutting edge portion (3c),
wherein a small diameter portion (6) is provided on a front end side of the body (1), the small diameter portion having an outside diameter smaller than a diameter of the drill, the cutting edge (3) with the point angles varied is formed in the small diameter portion, and a flat cutting edge (8) having an inclination angle (β) of 30° or less with respect to a line perpendicular to an axis of the drill is provided in a step portion formed between the small diameter portion (6) and a large diameter portion (7), the large diameter portion being provided on a rear side of the small diameter portion and having an original outside diameter, and
wherein a main helix angle (α2) of a helical flute (5) formed in the drill is set at an angle of 5° to 45°, and a helix angle (α1) in the small diameter portion (6) is set to be smaller than the main helix angle (α2) by varying a helix angle of the helical flute (5) at an axial-direction rear end of the small diameter portion (6).

2. The drill according to claim 1, wherein a dimension of a diameter-direction step in a portion where the flat cutting edge is formed, which is obtained according to an expression {(D−d)/D} where the diameter of the drill is expressed as D and a diameter of the small diameter portion (6) is expressed as d, is set at a ratio of 0.06 to 0.13 to the diameter of the drill.

3. The drill according to claim 1, wherein a diamond film (11) is formed on a surface of the body (1).

4. The drill according to claim 1, wherein the main helix angle (α2) of the helical flute (5) is set at an angle of 15° to 45°.

5. The drill according to claim 1, wherein the helix angle (α1) in the small diameter portion (6) is set smaller by 5° to 10° than the main helix angle (α2).

6. The drill according to claim 1, wherein a return portion (5a) is formed in a portion of the helical flute which forms the flat cutting edge (8), and a return angle (γ) of the helical flute in the return portion is set smaller by 5° to 10° than the main helix angle (α2) of the helical flute (5).

7. The drill according to claim 1, wherein a return portion (5a) is formed in a portion of the helical flute, which forms the flat cutting edge (8), and a drill-axial-direction width (W) of the return portion is set for 0.04 D to 0.07 D.

* * * * *